US011917050B1

(12) United States Patent
Fields et al.

(10) Patent No.: US 11,917,050 B1
(45) Date of Patent: Feb. 27, 2024

(54) SYSTEMS AND METHODS FOR GENERATING A BLOCKCHAIN-BASED USER PROFILE

(71) Applicant: State Farm Mutual Automobile Insurance Company, Bloomington, IL (US)

(72) Inventors: Brian Mark Fields, Normal, IL (US); Lee Marvin John Assam, El Paso, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 188 days.

(21) Appl. No.: 17/306,529

(22) Filed: May 3, 2021

Related U.S. Application Data

(63) Continuation of application No. 15/604,178, filed on May 24, 2017, now Pat. No. 11,025,409.

(51) Int. Cl.
| | | |
|---|---|---|
| *H04L 29/06* | (2006.01) | |
| *H04L 9/06* | (2006.01) | |
| *G06Q 20/38* | (2012.01) | |
| *G06Q 20/06* | (2012.01) | |
| *H04L 9/32* | (2006.01) | |

(Continued)

(52) U.S. Cl.
CPC ......... *H04L 9/0637* (2013.01); *G06Q 20/065* (2013.01); *G06Q 20/3825* (2013.01); *G06Q 20/3829* (2013.01); *H04L 9/0643* (2013.01); *H04L 9/14* (2013.01); *H04L 9/30* (2013.01); *H04L 9/3247* (2013.01); *G06Q 2220/00* (2013.01)

(58) Field of Classification Search
CPC ....... H04L 9/0637; H04L 9/0643; H04L 9/14; H04L 9/30; H04L 9/3247; G06Q 20/065; G06Q 20/3825; G06Q 20/3829; G06Q 2220/00
See application file for complete search history.

(56) References Cited

U.S. PATENT DOCUMENTS 10,205,595 B2 * 2/2019 Frascadore ........... H04L 9/0662
10,693,658 B2 * 6/2020 Jacobs ................. H04L 9/3255
(Continued)

OTHER PUBLICATIONS

Aru, "HashCoin Uses Emercoin Blockchain For Vehicle Registration And Tracking", Daily Short Recap of the Biggest Cryptonews, Dec. 2018, Retrieved from the Internet at: <URL: https://cointelegraph.com/news/hashcoin-uses-emercoin-blockchain-for-vehicle-registration-and-tracking (2018), 3 pages.

(Continued)

*Primary Examiner* — Joseph P Hirl
*Assistant Examiner* — Leynna Truvan
(74) *Attorney, Agent, or Firm* — Lee & Hayes, P.C.

(57) ABSTRACT

Systems and methods are described for generating a blockchain-based user profile. In various aspects, one or more blockchain IDs associated with a user is received, where each blockchain ID is associated with a corresponding blockchain. One or more blockchain transactions are identified that are associated with the one or more blockchain IDs, where a trust profile for the user can be generated based on the one or more blockchain transactions. The trust profile can include user information determined from the one or more blockchain transactions.

16 Claims, 5 Drawing Sheets

(51) Int. Cl.
   *H04L 9/30*      (2006.01)
   *H04L 9/14*      (2006.01)

(56) References Cited

U.S. PATENT DOCUMENTS

2015/0363777 A1   12/2015  Ronca et al.
2018/0130034 A1*  5/2018  Taylor ................... H04L 9/3234

OTHER PUBLICATIONS

Non Final Office Action dated Mar. 5, 2020 for U.S. Appl. No. 15/604,178 "Systems and Methods for Generating a Blockchain-Based User Profile", Fields, 18 pages.
Final Office Action dated Sep. 22, 2020 for U.S. Appl. No. 15/604,178, "Systems and Methods for Generating a Blockchain-Based User Profile", Fields, 22 pages.
PWC, "Blockchain in the insurance sector", PricewaterhouseCoopers LLP, 20169, Retrieved from the internet at: <URL: https://www.pwc.co.uk (2016), 2 pages.

* cited by examiner

FIG. 3A

Account Summary

| | |
|---|---|
| User | <user 1> |
| Blockchain Address | <public key 1> |
| Hash | <public key 1 hash> |
| No. Transactions | 67 |

User Information

| | |
|---|---|
| Physical address | 123 Wooddale Ln ... |
| email address | user1@website.com |
| Phone number | 987-654-3210 |
| Other | ... |

<transaction ID 1> — 2016-05-23 09:20:35 — 314
From: <public key 1>
To: <public key 2>
Amount: $639.57
Description: Credit Card Payment transaction ID 5 — 2016-11-15 11:59:17 — 316
From: <public key 1>
To: <public key 103>
Amount: $20,000.00
Description: 20 Percent Home Downpayment transaction ID 7 — 2017-04-23 14:20:16 — 318
From: <public key 1>
To: <public key 57>
Amount: 0.01425791 BTC
Description: Attorney Fee - Family Law Firm transaction ID 11 — 2017-04-28 16:35:45 — 320
From: <public key 83>
To: <public key 1>
Amount: $1,563.89
Description: Monthly Direct Deposit

...

SYSTEMS AND METHODS FOR GENERATING A BLOCKCHAIN-BASED USER PROFILE

PRIORITY

This application is a continuation of, and claims priority to, U.S. patent application Ser. No. 15/604,178, filed on May 24, 2017, entitled "SYSTEMS AND METHODS FOR GENERATING A BLOCKCHAIN-BASED USER PROFILE", and is fully incorporated by reference herein in its entirety.

FIELD OF THE DISCLOSURE

The present disclosure generally relates blockchain-based networks, and, more particularly to determining user information from blockchain transactions for authentication and validity purposes.

BACKGROUND

Conventional systems and methods use centralized databases or storage mechanisms to store user information and that can be used to identify users. This centralized database scheme typically allows updates and transactions to occur only in a synchronous fashion, where transactions stored in the database are serialized to occur one at a time. Such transactions are typically controlled and accessed by a single entity, for example, a company or private institution that controls the centralized database or storage mechanism.

The single entity control paradigm can create issues where the user information can be useful for other purposes because the user information is typically precluded from use in other applications even where the user is willing and able to give permission to use such information. Moreover, the single entity that controls and accesses the user may be reluctant to share the user information with other parties for a variety of privacy or business concerns.

BRIEF SUMMARY

The systems and methods described herein relate to user information as determined from blockchain-based transactions. In various embodiments, a blockchain may be a type of decentralized database network that keeps records of blockchain transactions, which are a type of digital transactions. Rather than having a single entity control a traditional database, a blockchain-based network can include a network of replicated databases that can be synchronized via a public network (e.g., the Internet), and, therefore visible to anyone within the network. Blockchain networks can also, however, be private with restricted membership similar to an intranet.

As described herein, when a blockchain transaction is executed, it can be grouped together into a cryptographically protected block with other blockchain transactions. In some embodiments, the block of blockchain transactions may be for transactions that occurred within a specific time period, such as within the last 10 minutes, and that are sent to the entire network for updating and storage in the replicated blockchain-based network. Members of the network, including computing nodes as described herein, can compete to validate the blockchain transactions for the network. In various embodiments, the validated transactions may then be added to the blockchain with a timestamp in chronological order. In this way, new blocks of validated transactions can be linked to older blocks, making a chain of blocks that make up the blockchain and show every transaction made in the history of that blockchain. The blockchain can be updated at every node in the blockchain network such that the blockchain is replicated at every node, giving users of the blockchain network the ability to reconcile the transactions of any node against any other node at any given time.

The blockchain-based network's decentralized, open, and cryptographic nature allows users to trust each other and execute blockchain transactions in a peer-to-peer fashion, making the need for a single control entity obsolete. The blockchain-based network also provides enhanced security benefits, including discoursing and preventing hacking attacks that commonly impact single control entities such as banks. For example, if a hacker targeted a particular block in a blockchain, the hacker would not only need to hack into that specific block, but all of the proceeding blocks linked to that blockchain spanning the entire history of the blockchain. Moreover, the attacker would also need to perform the same hack on every blockchain in the network, which could be millions, simultaneously, therefore making hacking a blockchain infeasible.

Accordingly, as described herein, systems and methods are disclosed for validating a user of blockchain-based networks services, including the identification and authority of such a user, based on one or more of user's blockchain accounts, profiles, or blockchain transactions. The disclosed systems and methods can aggregate various transactions from one or more of the user's blockchains and analyze those transactions to identify any number of validation events (e.g., trigger events or red flags) for various use cases, for example, using a blockchain-based transactions or information therein to determine to withhold an insurance claim check to a spouse of a user where the user's blockchain transactions indicate that the user was recently divorced.

In various embodiments, blockchain-based systems and methods are disclosed for performing blockchain validation of user identity and authority, where one or more processors can receive a first blockchain ID and a second blockchain ID, and where each of the first blockchain ID and the second blockchain ID is associated with a user. In some embodiments, the first blockchain ID can be a first public key associated with a first private key, and the second blockchain ID can be a second public key associated with a second private key. As described herein, public and private keys are cryptographic keys that typically are generated in public-private key pairs and are used in blockchain-based networks to identify a user and protect a user's resources on a blockchain-based network.

In some embodiments, the first blockchain ID can be associated with a first blockchain and the second blockchain ID can be associated with a second blockchain. In various embodiments, the first blockchain and/or the second blockchain can also be associated with certain blockchain types including, for example, any of a bank-based blockchain, a bitcoin-based blockchain, an insurance-based blockchain, a public blockchain, or a private blockchain. Each blockchain type may have different characteristics or attributes that may cause the blockchain-based validation system and methods to operate according to the blockchain type. For example, where a blockchain is a private blockchain, and at least in one embodiment, the blockchain-based validation system and methods may receive an indication from the user as to whether a private transaction associated with the user may be accessed.

In some embodiments, a plurality of blockchain transactions may be aggregated where the plurality of blockchain transactions can include at least a first blockchain transaction associated with the first blockchain and a second blockchain transaction associated with the second blockchain. Based on the first blockchain transaction or the second blockchain transaction, a first validation event providing a first indication of validity for the user may be identified. In some embodiments, the indication of validity can be used to authorize the user for an activity as further described herein.

In other embodiments, the blockchain-based validation system and methods may be further configured to identify a second validation event based on the first blockchain transaction or the second blockchain transaction, where the second validation event provides a second indication of validity for the user, such that the blockchain-based validation system and methods may determine an updated indication of validity for the user based upon the first validation event and the second validation event.

As described further herein, each of the first validation event and/or the second validation event can be associated with various event types including, for example, a property purchase event, a vehicle purchase event, a user-life event, a frequency-of-occurrence event, a significant financial event, a location event, or a disputed transaction event.

In some embodiments, the blockchain-based validation system and methods may be further configured to receive a security-based indicator for the user (e.g., a biometrics security indicator such as a digital finger print), and provide an enhanced indication of validity for the user based on the security-based indicator for the user and the first validation event.

In various embodiments, systems and methods are disclosed for generating a blockchain-based user profile. For example, a blockchain-based user profile can be associated with a particular user (e.g., an insurance customer who is a user of the blockchain-based network) and can be updated based on one or more of the user's blockchain transactions. As described herein, in one embodiment, the profile may be used as a customer service tool where a customer service representative uses the blockchain-based user profile to authenticate or validate the user, therefore, requiring less authentication/validation for users or customers with positive profiles, such as a blockchain-based user profile that has little or no negative validation events. In other embodiments, the user profiles may be used to provide benefits and incentives (e.g., insurance discounts or other benefits) to customers with positive profiles. In other embodiments, premiums may be adjusted, for example, increased, for user's having profiles with negative blockchain validation events.

In various embodiments, blockchain-based systems and methods are disclosed for generating a blockchain-based user profile. In various aspects, one or more blockchain IDs associated with a user may be received by one or more processors. Each blockchain ID can be associated with a corresponding blockchain in a blockchain-based network. One or more blockchain transactions may be identified that are associated with the one or more blockchain IDs such that a trust profile for the user can be generated based on the one or more blockchain transactions. In some embodiments, the trust profile can be generated also based on non-blockchain transactions, as further described herein. The trust profile can include user information determined from the one or more blockchain transactions or from the non-blockchain transactions. In some embodiments, the user information can include, for example, user tax records, user bills, user social media information, or one or more photos of the user.

In some embodiments, the blockchain-based systems and methods may further be configured to receive a session blockchain ID from a remote computing device, where the session blockchain ID can be associated with the user. The session blockchain ID may be used to facilitate a chat session, wherein the chat session is operable to receive one or more messages from the remote computing device and to transmit one or more messages to the remote computing device. In some embodiment, the session blockchain ID can be a blockchain ID from one or more blockchain IDs associated with the user. In another embodiment, the session ID and the trust profile can be used to authorize the remote computing device to receive the user information. In still a further embodiment, the blockchain-based system may be configured to request additional user information of the user from the remote computing device.

In other embodiments, the blockchain-based system may be further configured to receive an additional blockchain ID associated with the user, where the additional blockchain ID is associated with an additional blockchain, and where one or more additional blockchain transactions are identified that are associated with the additional blockchain ID. The trust profile may be updated for the user based on the one or more additional blockchain transactions, such that the trust profile is enhanced and includes additional user information determined from the one or more additional blockchain transactions.

In some embodiments, the trust profile can be used to determine one or more loyalty benefits for the user. In other embodiments, the blockchain-based system can update one or more accounts of the user based on the trust profile as described herein.

Advantages will become more apparent to those of ordinary skill in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the system and methods disclosed therein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and instrumentalities shown, wherein:

FIG. 3A illustrates an embodiment of a blockchain-based user account or profile in accordance with the disclosures herein.

FIG. 3B illustrates an embodiment depicting user blockchain transactions associated with the blockchain-based user account or profile of FIG. 3A.

The Figures depict preferred embodiments for purposes of illustration only. Alternative embodiments of the systems and methods illustrated herein may be employed without departing from the principles of the invention described herein.

DETAILED DESCRIPTION

Figure 1:
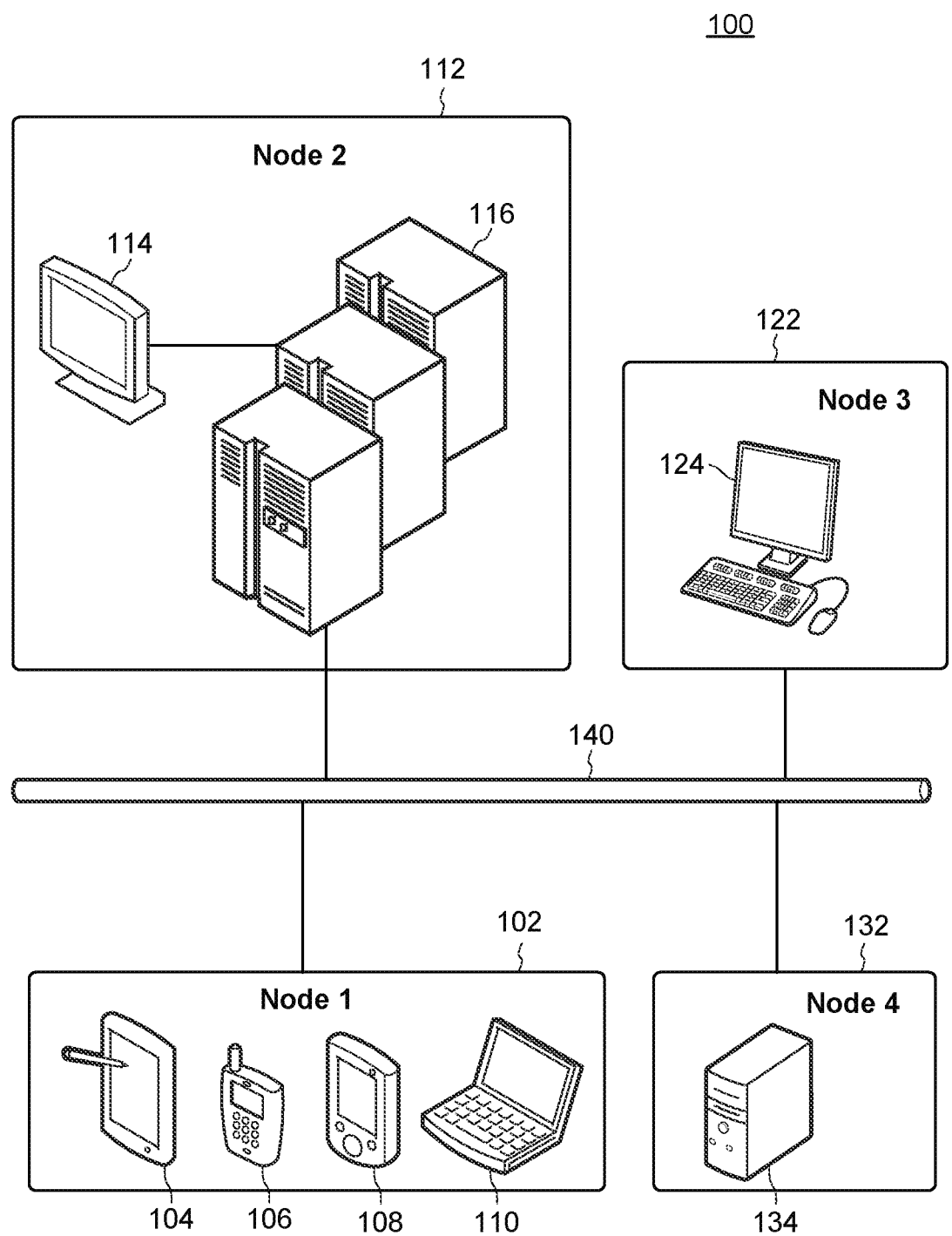
FIG. 1 illustrates an example network diagram depicting several nodes in a blockchain-based network.

FIG. 1 illustrates an example network diagram depicting several nodes in a blockchain-based network 100. Node 1 102 is a computing node that can be a computing device, such as a computing device of a user. For example, Node 1 102 can be a tablet device 104, a mobile phone 106, a smart phone 108, or a personal computer 110. In the embodiment of FIG. 1, Node 1 102 is connected to computer network 140, where Node 1 102 is capable of electronic communication with other nodes connected to computer network 140, including Node 2 112, Node 3 122, and Node 4 132. Computer network 140 can include wired or wireless types of electronic communication for the transmission of computer data, including, for example, a local area network (LAN), a wide area network (WAN) (e.g., the Internet), and may consist of one or more cellular networks. Computer network 140 may utilize several protocols or networking standards to facilitate transmission of computer data, including, for example, Ethernet, TCP/IP protocols, the WiFi protocol, the Bluetooth protocol, TDMA, CDMA, GSM, iDen, or similar protocols or technologies.

Node 2 112, for example, can represent a computing node that includes one or more server(s) 116 that may be accessed by any of the other nodes, including, for example, Node 1 102 over computer network 140. Server(s) 116 may also be accessed by a local client device 114, for example, by a representative or other user associated with Node 2 112 or server(s) 116. Node 3 122 can include an additional computing device 124, for example, a second user personal computer, connected to computer network 140. Node 4 132 can include a further computing device 134, such as a server or other networked computing device, connected to computer network 140. While the embodiment of FIG. 1 depicts only Nodes 1-4 (102-132), many more nodes, including many more computing devices, can be connected to, and operable to communicate via, computer network 140 in accordance with the embodiment disclosed herein. Each of the Nodes 1-4 (102-132) can include one or more processors, one or more computer memories (including RAM or ROM based computer storage), one or more communication interfaces (including a wired or wireless interface) for facilitating electronic communication over network 140, and/or one or more output devices (such as a screen, and an input device, such as a mouse, keyboard, touchscreen, or similar device).

In various embodiments herein, Nodes 1-4 (102-132) can communicate over computer network 140 in a client-server capacity, for example, using requests and responses via the Hyper Text Transfer Protocol (HTTP), Hyper Text Markup Language (HTML), and similar protocols and languages. In one embodiment, a computing device, such as server(s) 116 at Node 2 112, can execute a webserver platform, including, for example, Java Server Pages (JSP), Active Server Pages (ASP).NET, Ruby on Rails to facilitate client-server communication. In the present embodiment, the server(s) 116 at Node 2 112 could receive requests from other nodes, for example, Node 1 102, Node 3 122, or Node 4 132. For example, in one embodiment, personal computer 110 at Node 1 102 can send one or more requests to server(s) 116 at Node 2 112 and receive related responses. The requests may be HTTP requests to retrieve one or more webpages, where server(s) 116 host a website and/or database for responding with HTML, or similar web language technologies (e.g., JavaScript, CSS, etc.), for rendering the one or more webpages on the personal computer 110. In a similar embodiment, computing device 124 at Node 3 122 may also send requests to and receive responses from servers(s) 116. In an embodiment where Node 4 132 includes one or more server(s) 134, server(s) 116 may also communicate via computer network 140 with server(s) 134, where server(s) 134 may include information or services, such as user information (e.g., user information not readily available to server(s) 116, such as non-blockchain user information) or other third-party information or services (e.g., weather information, an artificial intelligence service, etc.), where server(s) 116 may access the information or services at server(s) 134 via computer network 140 in a client-server capacity.

In some embodiments, as described herein, Nodes 1-4 (102-132) may facilitate client-server based messaging, where a first computing device at a first node may engage in a messaging session, such as a chat session, by sending and receiving one or more messages to and from a second computing device. For example, in one embodiment, a first user on personal computer 110 at Node 1 102 may communicate via computer network 140 with a second user on local client device 114 on server(s) 116 at Node 2 112 using computer messages as part of a chat session. The chat session may include a chat window on one or more webpages provided by server(s) 116 to local client device 114, where, text input into the chat window may cause the text to be sent to server(s) 116 and to local client device 114 for display to the second user. In some embodiments, the chat window may be implemented as a chat-based JavaScript program on the webpage as displayed by the personal computer 110, where the chat-based JavaScript program is capable of capturing the text in the chat window and transmitting the text via an HTTP request and a data format, for example, the Java Object Script Notation (JSON) format, to server(s) 116. Other protocols or formats may, however, be used similarly. The chat session may be used to facilitate validation of a user as described herein, where a user, on personal computer 110 at Node 1 102, may seek validation from the second user at local client device 114 on server(s) 116 at Node 2 112.

In various embodiments herein, Nodes 1-4 (102-132) form a blockchain-based network 100, which can include a type of decentralized network. A blockchain-based network may be operable where each of the Nodes 1-4 (102-132) includes a blockchain program. The blockchain program can perform functions such as validating and relaying blockchain transactions as disclosed herein. In some embodiments, each of the Nodes 1-4 (102-132) may join the blockchain-based network by installing the blockchain program, thereby instantiating a node as a blockchain enabled node. In various embodiments, the blockchain-based network may coexist with the client-server based network, where each of Nodes 1-4 (102-132) may perform both blockchain functionality and client-server functionality as described herein.

In the blockchain-based network 100, each Node 1-4 (102-132) can be an administrator node that can administer, manage, update, and/or maintain one or more blockchains or blockchain transactions in one or more blockchain networks. Accordingly, in at least some embodiments, the blockchain-based network can be decentralized, where no single node, e.g., any one of Node 1-4 (102-132) can control a particular blockchain, but instead, where every node can administer, manage, update, and/or maintain the blockchains in the network 100.

In some embodiments, the blockchain-based network can be a bitcoin blockchain-based network, where each node may administer, manage, update, and/or maintain one or more bitcoin blockchains by "mining" bitcoins. Bitcoins can be mined where each of the nodes compete, by solving computationally complex cryptographic algorithms, to update the bitcoin blockchain with new bitcoin transactions, where the winning node receives bitcoins as an incentive for updating the related blockchain. Every node participating in the blockchain-based network, regardless of which node wins, updates the blockchain with the new transaction, as described herein, such that each node has a copy of the updated blockchain. In this way, each node takes responsibility for administering, managing, updating, and/or maintaining the bitcoin blockchain.

Because each node in a blockchain-based network (e.g., Nodes 1-4 (102-132) of blockchain-based network 100), can be responsible for administering, managing, updating, and/or maintaining a blockchain, the blockchain-based network can serve as a distributed database, where no single node maintains the blockchain and every node can continually update and reconcile the blockchain, such that the blockchain is maintained and updated across the network.

In various embodiments, blockchains may be public or private. In some embodiments, public blockchains include blockchains that can be accessed by any node on the network. For example, in an embodiment where Nodes 1-4 (102-132) of blockchain-based network 100 are public, any node or user could access the blockchain, and, therefore blockchain transactions of blockchain-based network 100.

In other embodiments, private blockchains include blockchains that can be accessed only by certain nodes, such as privileged nodes, or by users of the blockchain-based network that provide security credentials (e.g., passwords) to access the blockchain. In other embodiments, a private blockchain may be made accessible where permission is provided to access the blockchain, such as, where a user provides permission to access a blockchain including the user's personal information, as further described herein. For example, in an embodiment where Nodes 1-4 (102-132) of blockchain-based network 100 are private, then only privileged nodes or users could access the blockchain, and, therefore blockchain transactions of blockchain-based network 100.

In various embodiments, storing information via a blockchain-based network can provide enhanced security over a storing data in traditional centrally located database, including eliminating risks that come with data being held centrally. For example, typical blockchain-based networks lack centralized points of vulnerability for computer hackers to attack. Specifically, no centralized version of this information exists for a hacker to corrupt. Instead, each of the nodes (e.g., Nodes 1-4 (102-132)) maintains a copy that can be analyzed and checked against the copies in each of the other nodes in order to reconcile a true version.

In addition, blockchain-based network security methods can use encryption technology. In various embodiments, users identify themselves in a blockchain-based network with a blockchain ID. In some embodiments, the blockchain ID is an encryption-based public key. A public key can be a cryptographic key that is associated with a private key that together form a user's public-private key pair. The public-private key pair can be used to execute transactions on a blockchain as described herein. In some embodiments, for example, a user's public key can be a long, randomly-generated string of numbers, which serves as a user's address on in a blockchain-based network. A user may engage in transactions on the blockchain-based network, where the transactions gets recorded in the blockchain as belonging to that address, e.g., as associated with that user's public key.

In various embodiments, a user's private key can act as the user's password that gives its owner access to their transactions or other digital assets as stored on the blockchain on the blockchain network. A user typically keeps the private key confidential to prevent other blockchain users from altering or viewing the user's blockchain-based information or making new transactions not authorized by the user.

In some embodiments, a public-private key pair can be generated for any of Nodes 1-4 (102-132) using the aforementioned blockchain program, for example, after the blockchain program is installed on a computing device at a particular node. In one embodiment, for example, Node 1 102 can generate its public-private key pair when the blockchain program is installed on personal computer 110.

In some embodiments, a public-private key can be used to authenticate blockchain transactions, for example, to verify that a transaction came from a particular blockchain user and that the blockchain transaction has not been modified in the blockchain-based network 100. For example, in an embodiment where blockchain-based network 100 includes bitcoin-based blockchains, a first user at Node 1 102 can, via the blockchain program, generate a public-private key pair as described herein. In the present embodiment, the first user can use his or her private key to, via the blockchain program, to digitally sign, and, therefore authenticate, a bitcoin transaction on the blockchain-based network 100. In some embodiments, each user can transfer value to another user by digitally signing a hash of the previous transaction and the public key of the other user and adding these to the end of the blockchain. Users can verify the signatures of the blockchain transactions in each block linked in a blockchain to verify the chain of ownership from one user to the next.

For example, in an embodiment regarding a bitcoin-based blockchain, a bitcoin transaction may be for the payment of a credit card statement for a credit card account associated with a user. As described further herein, a transaction can be created where the user makes a payment for his or her credit card via bitcoins, where the user specifies a transaction value (e.g., the amount of bitcoins to make for the credit card payment) and also the recipient of the bitcoins (e.g., the credit card company). The user can sign the transaction with his or her private key. The private key will generate the user's digital signature for the transaction. The user, using the blockchain program, can then submit the blockchain transaction to the blockchain-based network 100, where it may be added to the relevant blockchain in the blockchain network, such as blockchain-based network 100. Any party (e.g., the credit card company) with the first user's public key can then verify (by using its own blockchain program and the user's public key) that the transaction was actually created by the user because only the user's public key can correctly decipher the user's digital signature, thereby providing proof of authenticity for the transaction.

As contemplated herein, the blockchain-based network 100 may also include other types of blockchains including, for example, a bank-based blockchain, an insurance-based blockchain, a public blockchain, or a private blockchain as described herein.

In some embodiments, the blockchain based network 100 can check the consistency of existing and new transactions, and information therein, by each of its nodes (e.g., Nodes 1-4 (102-132)) on a periodic basis. In some embodiments, for example, each of the Nodes 1-4 (102-132) can reconcile every existing or new transaction in a blockchain, or in several blockchains, stored in each node in ten minute intervals, where each node communicates with other nodes to verify that the transactions are consistent in each node of the network.

In various embodiments herein, new transactions are grouped into blocks on a periodic basis to create or update blockchains in the blockchain-based network (e.g., network 100), where each block can consist of one or more transactions that have been executed in that time period. A next group of transactions can then be executed in the next time period and so on, each time period creating a new block to add to a blockchain in the blockchain network. Accordingly, multiple blocks of related transactions can be linked together thereby creating a blockchain as described herein. Thus, data or information embedded within a blockchain is embedded within the network as a whole. In addition, as described herein, in some embodiments, the blockchain can be public or private based on the network within it is stored.

As described herein, the data within the network can be difficult for a hacker or other intruder to corrupt because the data is redundantly stored in various nodes (e.g., Nodes 1-4 (102-132)), which each provide a check-and-balance on each other and also serve as a backup in the event one or more of the other nodes fail.

Figure 2:
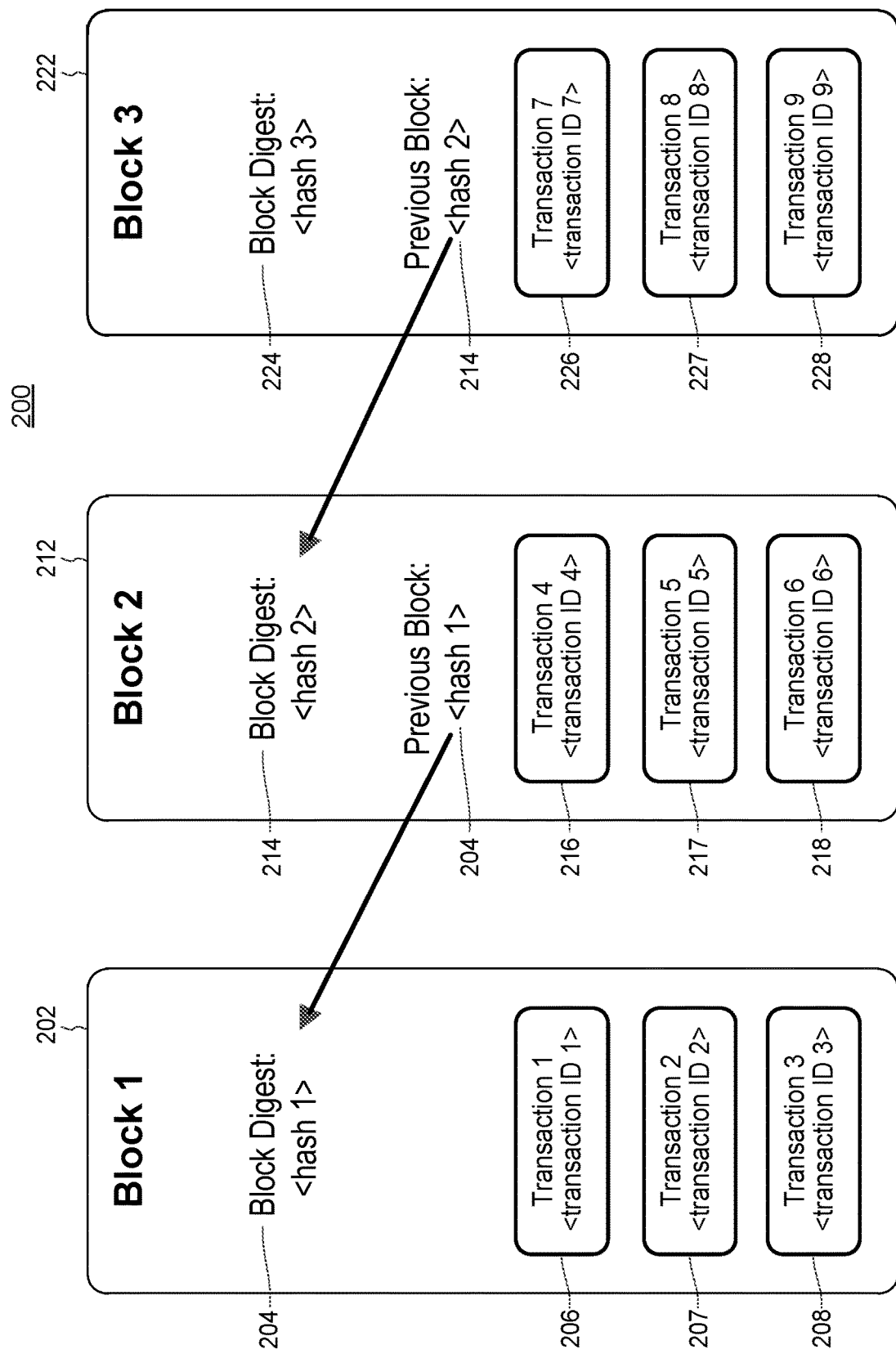
FIG. 2 illustrates an embodiment of a blockchain that exemplifies various blockchains as described herein.

FIG. 2 illustrates an embodiment of a blockchain 200 that exemplifies various blockchains as described herein. Blockchain 200 depicts three blocks, Block 1 202, Block 2 212, and Block 3 222, each containing blockchain transactions. While depicted with three blocks, where each blockchain contains three transactions each, blockchain 200, or any given blockchain as contemplated herein, may consist of many more blocks with various numbers of transactions, including millions of blocks each including different numbers of transactions.

In some embodiments, as described herein, each block can include transactions from a particular time interval (e.g., all new blockchain transactions are grouped into a block every 10 minutes). Each of the transactions can be associated with a separate and unique transaction ID, as shown in FIG. 2 and as further discussed for FIG. 3B. For example, Block 1 202 could consist of Transaction 1 206, Transaction 2 207, and Transaction 3 208, where each of Transactions 1-3 (206-208) may have separate transaction IDs (transaction IDs 1-3) and could have been analyzed and stored by a blockchain-based network (e.g., analyzed and stored by Nodes 1-4 (102-132) and blockchain-based network 100 of FIG. 1) in a first specific time interval (e.g., in a first 10 minute interval). Similarly, Block 2 212 could consist of Transaction 4 216, Transaction 5 217, and Transaction 6 218, where each of Transactions 4-6 (216-218) may have separate transaction IDs (transaction IDs 4-6) and could have been analyzed and stored by a blockchain-based network (e.g., analyzed and stored by Nodes 1-4 (102-132) and blockchain-based network 100 of FIG. 1) in a second time interval (e.g., in the next 10 minute interval). In addition, Block 2 could then be linked to Block 1 using a block digest (e.g., Block Digest 204) as described further herein. In addition, Block 3 222 could consist of Transaction 7 226, Transaction 8 227, and Transaction 9 228, where each of Transactions 7-9 (226-229) may have separate transaction IDs (transaction IDs 7-9) and could have been analyzed and stored by a blockchain-based network (e.g., analyzed and stored by Nodes 1-4 (102-132) and blockchain-based network 100 of FIG. 1) in a third time interval (e.g., the next 10 minute interval). In addition, Block 3 could then be linked to Block 2 using a block digest (e.g., Block Digest 214) as described further herein. Accordingly, the linked Blocks 1-3 (202, 212, 222) form blockchain 200.

The block digests 204, 214, and 224 of Block 1 202, Block 2 212, and Block 3 222, respectively, link the each of the blocks together. In some embodiments, as depicted in FIG. 2, the block digests (204, 214, and 224) may each include a hash value that serves as a digital proof of work for a block. In one embodiment, the hash value may be determined by the blockchain-network nodes (e.g., Nodes 1-4 (102-132)), where the hash value is the solution to a computationally expensive math problem that includes as input all the text from several new unverified transactions, plus the digest of the most recent block, plus a random value. The input values may be used in a hash function, such as SHA-256, to generate the hash value. As depicted in FIG. 2, each block may store the hash value of a previous block creating a link from one block to the next, and, therefore creating a blockchain. For example, Block 2 212 includes its own hash value 214 and also the hash value 204 of the previous Block 1 202, such that a link is established in the blockchain 200. Similarly, Block 3 222, includes its own hash value 224 and also the hash value 214 of the previous Block 2 212, such that a further link is established in the blockchain 200. Block 1 is depicted with no previous hash, which, in some embodiments indicates that Block 1 is the genesis, or first, block in the chain that each of the further blocks, including Block 2 212 and Block 3 222 link back to either directly or indirectly as shown for FIG. 2.

In some embodiments, the hash value may have a preferred format, such as a leading number of zeroes for the hash value. In such embodiments, the blockchain nodes, such as Nodes 1-4 (102-132) may compete to determine the correctly formatted hash value, where the first node to compute the hash value may receive a reward, such as a bitcoin. Assuming the new block is valid, it can become a part of the block chain.

FIG. 3A illustrates an embodiment of a blockchain-based user account or profile 302 in accordance with the disclosures herein. In various embodiments the blockchain-based user account or profile 302 may be stored or maintained in one or more computer memories, such as the one or more computer memories of Nodes 1-4 (102-132) as described for FIG. 1. The data or other information associated with the blockchain-based user account or profile 302 may be stored in memory via one or more databases, such as a relational database, including an Oracle or MySQL database, or a NoSQL type database, such as MongoDB database. In some embodiments, the blockchain-based user account 302 may be maintained by every computing node (e.g., Nodes 1-4 (102-132)) that the user account is associated with, such as every blockchain the user account has a transaction for, where each computing node stores a copy of the user account in its one or more computer memories, such as the computer memories described for FIG. 1. In another embodiment, the user account may be maintained only by the node associated with the user, such as Node 1 102, where the account is part of the blockchain program executing on the users computing node, such as personal computer 110 as described for FIG. 1. In a further embodiment, the users account may be maintained by a third party, such as a third party provider who provides services or products to the user, where the user account is maintained remotely. For example, in such an embodiment an insurance provider could maintain the user's account 302 on server(s) 116 at Node 2 112, where the user could access the account 302 remotely from personal computer 110 at Node 1 102.

In the embodiment of FIG. 3A, the blockchain-based user account 302 includes user information 306 associated with a user, where the user information 306 includes personal information about the user, including the user's physical address or location, the user's email address, and phone number. Other information may be included about the user in the user information 306 portion of the blockchain-based user account 302, where such other information could be information that further identifies the user on (e.g., an account number, social security number, etc.). In some embodiment, other information may also include transaction based information, such as non-blockchain transaction information such as tax filings or bank statements associated with the user.

The blockchain-based user account 302 may also include account summary information 304. The account summary information 304 may include the user's account name, which can be the user's real name or an alternate name, such as an email address or screen name (e.g., "user 1" as depicted for FIG. 3A). The account summary information 304 may also include blockchain-based information, such as the user's blockchain address on a given blockchain network, such as the blockchain-based network 100 of FIG. 1. In some embodiments, the user's blockchain address can be the user's public key used to execute blockchain transactions on the blockchain network as described herein. The user's blockchain address can associate the user with transactions that that the user executed in a blockchain network. The account summary information 304 may also include a hash value of the blockchain address, where, in the embodiment of FIG. 3A, for example, the hash value is a hash of the public key. In some embodiments, the hash value can be hash 160 value, which can serve as a shortened address compared with the user's blockchain address (e.g., public key), where, for example, a hash 160 value of the user's public key can serve as a short address that can be used to further identify the user on the block-chain based network, such as the blockchain-based network 100 of FIG. 1. While the embodiment of FIG. 3A depicts the user account having a single blockchain address, in other embodiments, the user's account may be associated with multiple blockchain addresses, each having, for example, separate public keys for use in various blockchains or blockchain networks.

The account summary information 304 may also include information regarding the number of block-chain transactions executed by the user. For example, in the embodiment of FIG. 3A, the user has executed 67 transactions, which may be transactions associated with the blockchain for the user's public key, e.g., "public key 1," as shown in FIG. 3A. In other embodiments, the blockchain transactions may indicate the total number of blockchain transactions executed associated several blockchains or blockchain networks.

FIG. 3B illustrates an embodiment depicting user blockchain transactions 312 associated with the blockchain-based user account or profile 302 of FIG. 3A. The blockchain transactions 312 may be associated with one or more events, purchases, or other transactions that are were made via, or maintained or stored by, a blockchain on a blockchain-based network (e.g., blockchain-based network 100). In one embodiment, each of the blockchain transactions 314-320 may be associated with a user's blockchain address, such as the user blockchain address, e.g., "public key 1", of user account 302 of FIG. 3A.

Each of the blockchain transactions 314-320 can include a transaction ID, a date stamp indicating a date or time at which the transaction was made, a blockchain address of the user who transmitted value (e.g., a "from" address), a blockchain address of a user who receives the value (e.g., a "to" address), an amount of the value that was transferred, and a description including information about the transaction. The value of the transaction can be in any type of currency, including, for example, in U.S Dollars ("$") or in bitcoins ("BTC").

For example, transaction 314 includes a transaction ID, "transaction ID 1," which, in some embodiments, can be an alphanumeric string that uniquely identifies transaction 314 within a blockchain. The transaction 314 can include a date time stamp (e.g., "2016-05-23 09:20:35") which indicates the date and time at which transaction 314 was executed. Blockchain transaction 314 also includes a blockchain address of the user who transmitted value as indicated by the "From" address. For blockchain transaction 314, the "From" address indicates public key 1 as associated with user 1 of user account 302 of FIG. 3A. Accordingly, in the embodiment of FIG. 3B, the blockchain transaction 314 is associated with user 1 of FIG. 3A as indicated by the public key 1, where blockchain transaction 314 can be one of user 1's blockchain transactions as executed for a blockchain in blockchain-based network 100 of FIG. 1. Transaction 314 may have been executed on user 1's computing device, such as personal computer 110 of Node 1 102. Blockchain transaction 314 indicates that a second user, a user with blockchain address with "public key 2" received the value of the transaction, here, for example, $639.57 U.S. Dollars, which is indicated by the amount for blockchain transaction 314. Blockchain transaction 314 also includes a description that indicates that blockchain transaction 314 was for a "Credit Card Payment," where, for example, in one embodiment, blockchain transaction 314 could have been for a credit card payment by the user 1 at Node 1 102 to pay off a credit card statement associated with a credit card account that user 1 holds with the second user (e.g., a credit card company) indicated at the public key 2 address of blockchain transaction 314.

Similarly blockchain transaction 316 includes a transaction ID, "transaction ID 5," which can be an alphanumeric string that uniquely identifies transaction 316 within a blockchain. The transaction 316 includes a date time stamp (e.g., "2016-11-15 11:59:17"), which indicates the date and time at which transaction 316 was executed. Blockchain transaction 316 also includes a blockchain address of the user who transmitted value as indicated by the "From" address. For blockchain transaction 316, the "From" address indicates public key 1 as associated with user 1 of user account 302 of FIG. 3A. Accordingly, in the embodiment of FIG. 3B, the blockchain transaction 316 is associated with user 1 of FIG. 3A as indicated by the public key 1, where blockchain transaction 316 can be one of user 1's blockchain transactions as executed for a blockchain in blockchain-based network 100 of FIG. 1. Transaction 316 may have been executed on user 1's computing device, such as personal computer 110 of Node 1 102. Blockchain transaction 316 indicates that a second user, a user with blockchain address with "public key 103," received the value of the transaction, here, for example, $20,000.00 U.S. Dollars, which is indicated by the amount for blockchain transaction 316. Blockchain transaction 314 also includes a description that indicates that blockchain transaction 316 was for a "20 Percent Home Downpayment," where, for example, in one embodiment, blockchain transaction 316 can be associated with a life event of user 1, where user 1 puts 20 percent down on the purchase of a home. The transaction could have been executed at Node 1 102, including, for example, at smart phone 108 associated with user 1, where the second user with public key 103 may be a bank, lender, mortgager, etc. associated with a loan the user receives for the balance of the home purchase.

Similarly, blockchain transaction 318 includes a transaction ID, "transaction ID 7," which can be an alphanumeric string that uniquely identifies transaction 318 within a blockchain. The transaction 318 includes a date time stamp (e.g., "2017-04-23 14:20:16"), which indicates the date and time at which transaction 318 was executed. Blockchain transaction 318 also includes a blockchain address of the user who transmitted value as indicated by the "From" address. For blockchain transaction 318, the "From" address indicates public key 1 as associated with user 1 of user account 302 of FIG. 3A. Accordingly, in the embodiment of FIG. 3B, the blockchain transaction 318 is associated with user 1 of FIG. 3A as indicated by the public key 1, where blockchain transaction 318 can be one of user 1's blockchain transactions as executed for a blockchain in blockchain-based network 100 of FIG. 1. Transaction 318 may have been executed on user 1's computing device, such as personal computer 110 of Node 1 102. Blockchain transaction 318 indicates that a second user, a user with blockchain address with "public key 57" received the value of the transaction, here, for example 0.01425791 bitcoins, which is indicated by the amount for blockchain transaction 318. Blockchain transaction 318 also includes a description that indicates that blockchain transaction 318 was for a "Attorney Fee-Family Law Firm," where, for example, in one embodiment, blockchain transaction 318 can be associated with a life event of user 1, such as a marriage event (e.g., marriage license), a life planning event (e.g., a user will), or a divorce event (e.g., where user 1 has engaged legal services regarding a divorce with a spouse). The transaction could have been executed at Node 1 102, including, for example, at personal computer 110 associated with user 1, where the second user with public key 57 may be an attorney or law firm, associated with the Family Law Firm that received a payment for legal fees rendered.

Similarly, blockchain transaction 320 includes a transaction ID, "transaction ID 11," which can be an alphanumeric string that uniquely identifies transaction 320 within a blockchain. The transaction 320 includes a date time stamp (e.g., "2017-04-28 16:35:45"), which indicates the date and time at which transaction 320 was executed. Blockchain transaction 320 also includes a blockchain address of the user who transmitted value as indicated by the "From" address. For blockchain transaction 320, the "From" address indicates public key 83, which may be a user of the blockchain-based network 100 of FIG. 1. In the embodiment of FIG. 3B, the blockchain transaction 320 is associated with user 1 of FIG. 3A as indicated by the public key 1, where blockchain transaction 320 can be one of user 1's blockchain transactions as executed for a blockchain in blockchain-based network 100 of FIG. 1. Transaction 320 may have been executed by a computing device, such as such as server 134 of Node 4 132. Blockchain transaction 320 indicates user 1 (having blockchain address with "public key 1") received the value of the transaction, here, for example $1,563.89 U.S. Dollars, which is indicated by the amount for blockchain transaction 320. Blockchain transaction 320 also includes a description that indicates that blockchain transaction 320 was for a "Monthly Direct Deposit," where, for example, in one embodiment, blockchain transaction 320 can be associated with an event of user 1, such as a paycheck or payment from user 1's employer (e.g., associated with server 134 at Node 4 132) executing a blockchain transaction to pay the user 1 his or her monthly salary via direct deposit into user 1's bank account.

It will be appreciated that while although only transactions 314-320 are depicted and described for FIGS. 3A and 3B, a user, such as user 1, may be associated with many more transactions, such as thousands of transactions and across multiple blockchains, each from different spans of time, including spanning multiple years or decades, and each associated with different types of blockchains as described herein.

Figure 4:
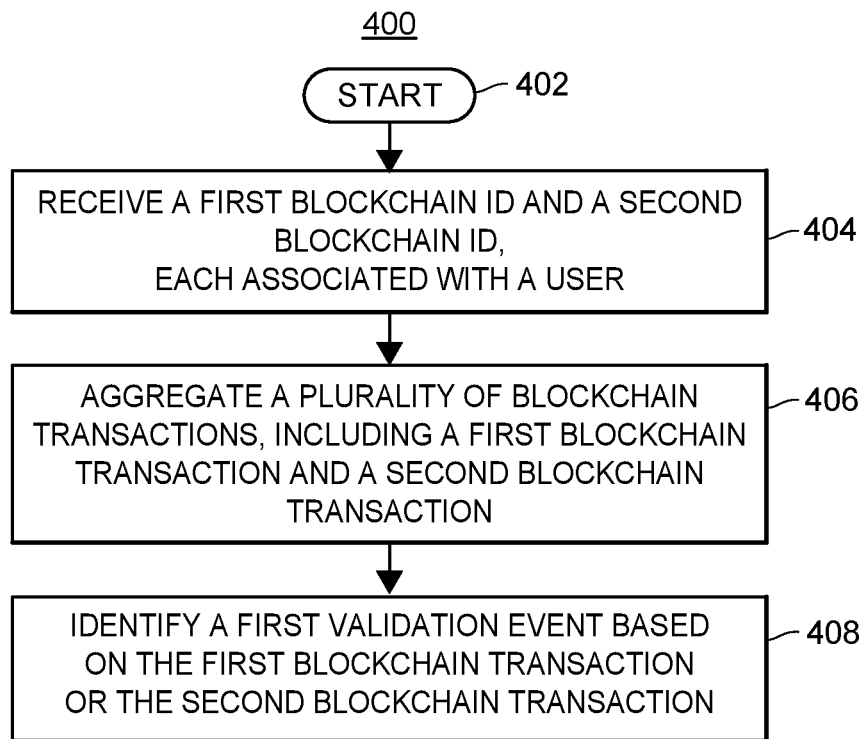
FIG. 4 illustrates an example blockchain-based method for performing blockchain validation of user identity and authority.

FIG. 4 illustrates an example blockchain-based method 400 for performing blockchain validation of user identity and authority. Method 400 may be executed on a node of a blockchain-based network, for example, any of the Nodes 1-4 (102-132) on blockchain-based network 100, where the node can execute instructions stored in the one or more computer memories of the node to execute method 400. Method 400 may begin (402) at block 404 by receiving a first blockchain ID and a second blockchain ID, where each of the first blockchain ID and the second blockchain ID is associated with a user. In some embodiments, for example, the user may be a client or customer of an entity associated with the blockchain-based validation system as described herein. The blockchain-based validation system may be located at one or more nodes in the blockchain-based network, including, for example, any of Nodes 1-4 (102-132) on blockchain-based network 100.

In some embodiments, the first blockchain ID can be a first public key associated with a first private key and the second blockchain ID can be a second public key associated with a second private key, where each of the first public key and first private key, and the second public key and the second private key, can be cryptographic public-private key pairs as described herein.

In some embodiments, the first blockchain ID can be associated with a first blockchain and the second blockchain ID can be associated with a second blockchain. Each of the blockchains may be blockchains maintained by the blockchain-based network 100 of FIG. 1. In various embodiments, the first blockchain and/or the second blockchain can be associated certain blockchain types including, for example, any of a bank-based blockchain, a bitcoin-based blockchain, an insurance-based blockchain, a public blockchain, or a private blockchain.

In some embodiments, each blockchain type may have different characteristics or attributes that can cause the blockchain-based validation system and methods to operate according to the blockchain type. For example, where a blockchain is a private blockchain, at least in one embodiment, the blockchain-based validation system and methods may receive an indication from the user as to whether a private transaction associated with the private blockchain may be accessed. In other embodiments, a user could specify what types of information is private. For example, the user may specify that information related to life-events (e.g., marriage or child-birth events) is private. In such embodiments, the validation system would not access such private information. In some embodiments, the user's indication of validation, account, or profile, such as a trust profile, may be lowered to account for the decrease in information, such that a user that has indicated private life-event information may receive more questions or challenge prompts when attempting to access a blockchain-based validation system or otherwise interacting acting with the blockchain-based system or related representatives, such as a second user at local client device 114 on Node 2 112 of FIG. 1.

At block 406 a plurality of blockchain transactions can be aggregated where the plurality of blockchain transactions can include at least a first blockchain transaction associated with the first blockchain and a second blockchain transaction associated with the second blockchain.

At block 408, a first validation event providing a first indication of validity for the user may be identified based on the first blockchain transaction or the second blockchain transaction. For example, in one embodiment, the indication of validity can be used to authorize the user for an activity, for example, the activity of a user picking up an insurance claim check for a supposed spouse. In various embodiments, the blockchain-based validation system may identify the first validation event by scanning for factors in the blockchain transactions of a user to identify validation triggers, flags or events associated with the user. In some embodiments, the transactions may indicate various validation events based on the data within the transactions. Validation events can include information determined from blockchain transactions including, for example, life events such as a marriage event, a child birth event, or divorce event. In other embodiments, a validation event may include information determined from a financial event, such as credit card transaction event(s) or large financial events, such as the purchase of a house, car, etc. In other embodiments, the frequency of the validation events may be considered, such as credit card transactions considered over a long or short period of time, where, for example, payment of credit card statements over several years (with no late payments, etc.) can indicate a high level of validity for the user.

In other embodiments the recency of a validation event may impact a user's indication of validity. For example, in such embodiments, a transaction that is dated later in time may provide a greater indication of validity than an older transaction. For example, a transaction indicating a divorce event that occurred more recently than an older transaction indicating a marriage event may result in a decrease in an indication of validity for a particular user in a particular circumstance, such as where a user requests to pick up an insurance claim check for a spouse, but where the user's blockchain transaction(s) indicate that the user has recently been divorced.

In some embodiments, the validation events may be assigned different weights, where one validation event may impact a user's indication of validity differently from a second validation event. In one embodiment, using the previous example, a divorce event may be assigned a higher weight than the marriage event where the divorce event occurred more recently than the marriage event.

In some embodiments, a representative using the blockchain validation system, such as a representative at Node 2 112 on local client device 114, can use the indication of validity to validate, or otherwise authorize, a user, e.g., for a given activity. For example, the validation may occur remotely, where a user or spouse of a user interacts with a representative of the blockchain validation system via the Internet or over the phone. In such embodiments, either the customer or spouse, or the user's or spouse's computing device, such as personal computer 110, may send one or more blockchain IDs to the representative system (such as server(s) 116 at Node 2 112) where the servers(s) 116 can access the user's or spouse's blockchain information in the blockchain-based network 100 based on the provided blockchain IDs. The blockchain transactions from the user's or spouse's blockchains can then be used to validate the user or spouse, or allow the representative to review the history of the user or spouse. If the user's blockchain information is insufficient for validation, the representative may, at that point, challenge the user or spouse such as, for example, asking additional security questions, etc.

For example, the representative may validate a user requesting to pick up an insurance claim check, where the user's (and, in some embodiments, the spouse's) blockchain information contains a blockchain validation event that provides an indication of validity below a certain validity threshold. For example, in some embodiments as described herein, the representative could check a user trust profile with a trust factor that indicates whether the user is authorized to pick up the check. With a high trust profile, the user may be authorized to pick up the check. However, for a low trust profile, the user may be denied or it may cause the representative to request additional information or contact the customer in order to obtain permission. In some embodiments, positive validation events could be that the user shares a common address and credit card transactions with the spouse. In other embodiments, negative validation events could include a recent divorce event or an indication that the supposed spouse and the user now live at different addresses. Similarly, certain transactions can trigger negative validation events and, therefore, decrease an indication of validity for a user. For example, for a transaction that includes location information, such as the address at which a purchase was made, and where the transaction differs substantially from a user's typical location, then such transaction may be considered fraudulent or could otherwise diminish the user's indication of validity or at least the validity of the particular blockchain that the particular transaction is associated with.

In various embodiments, each blockchain transaction of a user can update the blockchain-based network 100, causing a user account or user profile, such as a user trust account, to be updated accordingly. For example, in some embodiments, a user executing a new bitcoin-based transaction could be updated in the blockchain-based network 100 by each of the Nodes 1-4 (102-132). In the present embodiment, a node, such as Node 2 112 may then analyze a user's profile for existing blockchain IDs and use the user's blockchain IDs to identify the new bitcoin-based transaction and update the user's account or profile as described herein.

In some embodiments, the blockchain-based validation system and methods may be further configured to identify a second validation event based on the first blockchain transaction or the second blockchain transaction, where the second validation event provides a second indication of validity for the user, such that the blockchain-based validation system and methods may determine an updated indication of validity for the user based upon the first validation event and the second validation event. As described herein, some events can be more highly weighted than other events, where newer events can be more highly weighted than older events.

In addition, in some embodiments, the validation system may choose to ignore one or more of the validation events, where the updated validation event causes as past validation event to be ignored by the validation system. For example, where the first validation event is a recent divorce and the second validation event is a past marriage, then the second validation event can be ignored by the system.

In another embodiment, an updated validation event can be a combination of the first validation event and second validation event, which together create an enhanced validation event. For example, a first validation event may be several years of credit card history showing that the user is a responsible account holder (e.g., having a high credit score) and a second validation event can be a bank direct deposit account as determined from several bank-based blockchain transaction indicating that the user has a steady job and source of income. Together these can create an enhanced validation event improving the user's indication of validity.

In various embodiments, and as described herein, each of the first validation event and/or the second validation event can be associated with various event types including, for example, a property purchase event, a vehicle purchase event, a user-life event (e.g., a married event, a divorced event, a child-birth event, etc.), a frequency-of-occurrence event (e.g., multiple addresses, multiple purchases events, etc.), a significant financial event (e.g., home purchase event, car purchase event, tax filing event, etc.), a location event, or a disputed transaction event.

In some embodiments, a blockchain transaction may include a dispute from a user as to one or more blockchain transactions. For example, the user may dispute that the transaction was entered into by the user or that the transaction was fraudulent or that an error occurred with respect to the transaction. Such a transaction can serve as a validation event that increases the user's indication of validity by ignoring the disputed transaction or by giving the transaction less weight in determining the indication of validity, e.g., from an aggregate of multiple transactions, where the disputed transaction is only one of multiple other non-disputed transactions.

In some embodiments, the blockchain-based validation system and methods may be further configured to receive a security-based indicator for the user, and provide an enhanced indication of validity for the user based on the security-based indicator for the user and the first validation event. The security-based indicator could include, for example, a biometrics indicator such as an electronic finger print or an electronic voice print, or the security-based indicator can be additional information associated with the user such as a caller ID number of the user or a password provided by the user.

Figure 5:
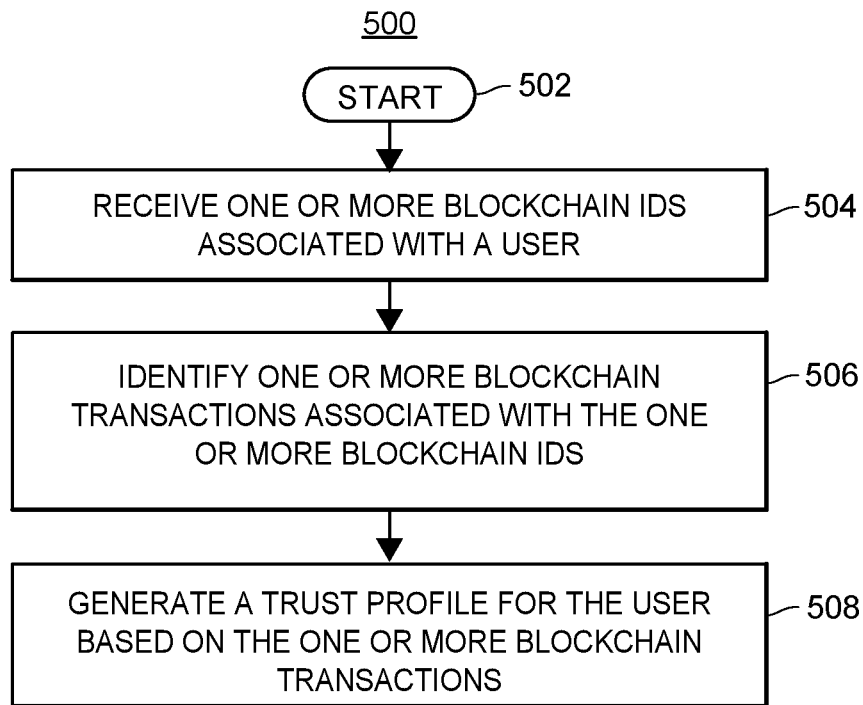
FIG. 5 illustrates an example method for generating a blockchain-based user profile.

FIG. 5 illustrates an example method 500 for generating a blockchain-based user profile. Method 500 may be executed on a node of a blockchain-based network, for example, any of the Nodes 1-4 (102-132) on blockchain-based network 100, where the node can execute instructions stored in the one or more computer memories of the node to execute method 500. For method 500, a trust relationship between a user and a second entity can be established based on the user's history, as determined from the user's blockchain transactions and other information (e.g., non-blockchain information). The trust relationship may be used to create a trust profile as described herein. The trust profile may be used, for example, to provide a user with enhanced client service, such as allowing fewer security challenges for a trusted user. In other embodiments, the trust profile may also be used to provide the user with financial benefits, including discounts or loyalty rewards for users with sufficient trust profiles.

Method 500 begins (502) at block 504 where one or more blockchain IDs associated with a user may be received, where each blockchain ID is associated with a corresponding blockchain.

At block 506, one or more blockchain transactions may be identified that are associated with the one or more blockchain IDs.

At block 508 a trust profile for the user can be generated based on the one or more blockchain transactions. In some embodiments, the trust profile can be generated also be based on non-blockchain transactions, as further described herein, for example, with respect to FIG. 6. The trust profile can include user information determined from the one or more blockchain transactions. In some embodiments, the user information can include, for example, user tax records, user bills, user social media information, or one or more photos of the user.

In some embodiments, the blockchain-based systems and methods may further be configured to receive a session blockchain ID from a remote computing device, where the session blockchain ID can be associated with the user. The session blockchain ID may be used to facilitate a chat session, wherein the chat session is operable to receive one or more messages from the remote computing device and to transmit one or more messages to the remote computing device. In some embodiments, the session blockchain ID can be a blockchain ID from one or more blockchain IDs associated with the user. For example, a first user at Node 1 102 can initiate a chat session with a second user at Node 2 11). The chat session may be initiated, for example, via a web browser on personal computer 110 executing an HTML and JavaScript webpage provided by server(s) 116 at Node 2 112. When the chat session is executed, for example, by the first user selecting to initiate a chat session from the webpage, the webpage may cause a request that includes the first user's blockchain ID (e.g., the first user's public key) to be sent to the server(s) 116 at Node 2 122. In one embodiment, the blockchain ID may be already be associated with the first user's web browser such that the blockchain ID is sent automatically with the request. In another embodiment, the first user may have to specify the blockchain ID in the web browser, such as on the web page, prior to executing the chat session.

In the present embodiment, the server(s) 116 may use the blockchain ID to access the user's blockchain transactions associated with that blockchain ID on the blockchain-based network, such as network 100. In some embodiments, the server(s) 116 may also use the blockchain ID to identify the user to access other information, e.g., non-blockchain information such as tax records, associated with the user in order to enrich the chat session. In other embodiments, the two or more blockchain IDs may be sent from the user's web browser to sever(s) 116 to further enhance the information about the user. In various embodiments, an application at server(s) 116 may use the information, for example, to generate a trust profile based information taken from one or more transactions from one or more blockchain IDs as described herein, for example, for FIG. 6. In other embodiments, the second user at 114 may access the information to facilitate the chat session as describe herein.

In some embodiments, the blockchain ID may be a new blockchain ID of the user not originally part of the one or more blockchain IDs used to generate the trust profile. In another embodiment, the session ID and the trust profile can be used to authorize the remote computing device to receive the user information. In still a further embodiment, the blockchain-based system may be configured to request additional user information of the user from the remote computing device in order to authenticate the user in cases where not enough user information can be determined from the blockchain transactions alone. For example, the first user, via mobile computing device at Node 1 102, such as smart phone 108, can communicate with the second user, where the mobile computing device at Node 1 102 provides the blockchain ID.

In other embodiments the blockchain-based system may be further configured to receive an additional blockchain ID associated with the user, where the additional blockchain ID is associated with an additional blockchain, and where one or more additional blockchain transactions are identified that are associated with the additional blockchain ID. The trust profile may be updated for the user based on the one or more additional blockchain transactions, such that the trust profile is enhanced and includes additional user information determined from the one or more additional blockchain transactions.

In some embodiments, the trust profile can be used to determine one or more loyalty benefits for the user which can include, for example, insurance premium discounts, enhanced client service, etc. In other embodiments, the blockchain-based system can update one or more accounts of the user based on the trust profile, for example, low trust profiles can indicate a higher risk user, such that a higher insurance premium may be associated with a user having a low trust profile.

Figure 6:
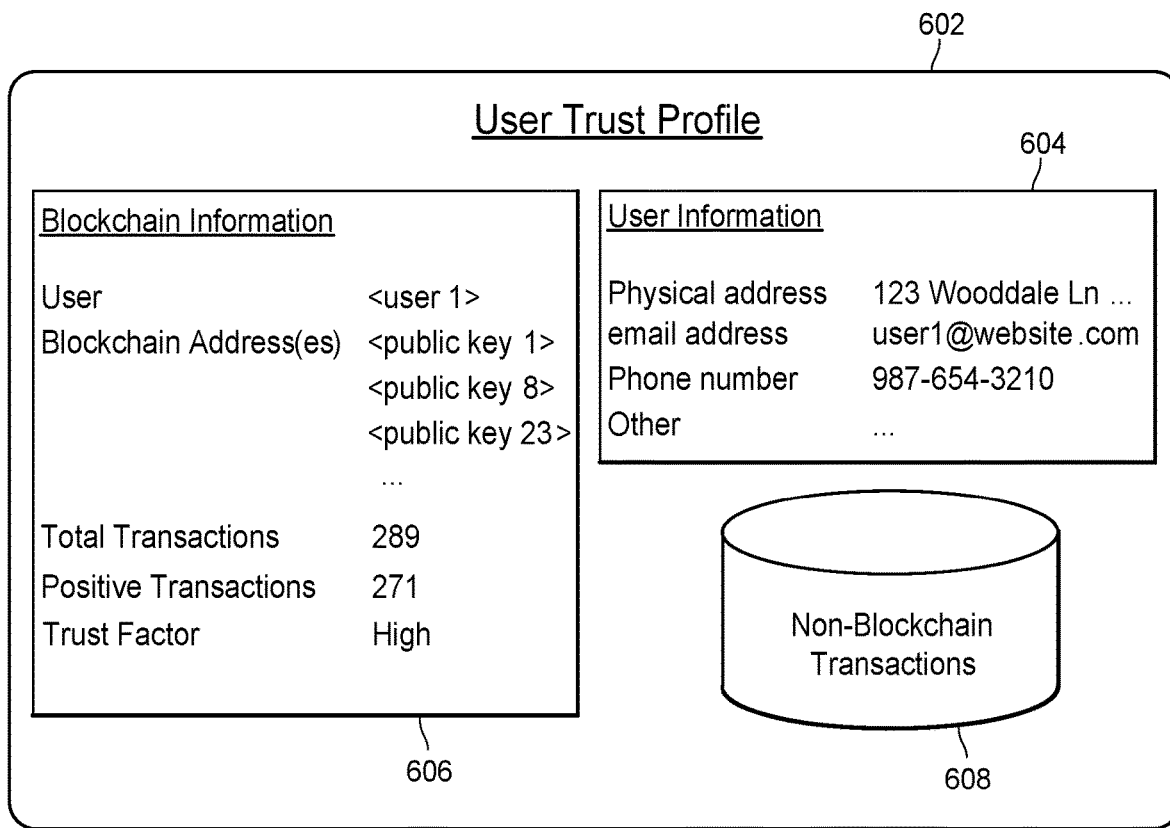
FIG. 6 illustrates an embodiment of a user trust profile associated with user blockchain information.

FIG. 6 illustrates an embodiment of a user trust profile 602 associated with user blockchain information. For example, in one aspect, the user trust profile 602 may be associated with the user account or profile 302 of FIG. 3A and the related user blockchain transactions 314-320 of FIG. 3B. For example, in the embodiment of FIG. 6, user trust profile 602, includes the same user information 604 as the user information 306 of from FIG. 3A. As described herein, the user trust profile 602 can be determined from the user's blockchain transactions. The trust profile 602 may be determined from information within one or more transactions across one or more blockchains, including information from various past blockchain transactions in different blockchain accounts for the user where the user has different blockchain IDs. As described herein, information can include, for example, whether the user has been married, for how long the user has been married, whether the user has been divorced, when the user was divorced, the address or addresses associated with the user, tax information (including tax returns) of the user, or other user information. In various embodiments, the sources of the user information may be the user's bills, tax records, or other information either taken directly from blockchain transactions associated with that information (e.g., a bitcoin transaction used to pay a credit card bill) or non-blockchain transactions or information, as described below, such as the user's tax records that the user has uploaded to the user's blockchain account or for purposes of creating the user profile.

For example, the user trust profile can be determined from blockchain transactions 314-320 and related information as described for FIG. 3B. The user trust profile 602 may include the user's blockchain information 606, which can include the user's email address or screen name (e.g., "user 1" as depicted for FIG. 3A and for FIG. 6). The blockchain information 606 may also include one or more blockchain address(es) associated with the user, for example, public key 1, public key 8, and public key 23 as depicted for FIG. 6. It will be appreciated, however, that the user may have additional blockchain addresses. The blockchain information 606 may also include a total number of blockchain transactions for the user, which can represent the total number of blockchain transactions across all blockchains that the user is associated with. Of that total number of blockchain transactions, the blockchain information 606 may also indicate which of those transactions are "positive" or no-issue transactions, where such transactions indicate a positive (or non-negative) validation event that can be used to validate the user. The blockchain information 606 may also include a trust factor, which can be an enumerated value (e.g., "High," "Medium," or "Low" trust), based off the user's number of positive transactions compared to the user's total transactions. In the embodiment of FIG. 6, for example, because the user has 271 positive transactions and 289 total transactions, then a high correlation of positive transactions exists and can result in the user receiving a "High" trust factor as shown.

In some embodiments, information received from other sources (e.g., non-blockchain transactions 608) may also be associated with a user's profile. The information may include user information from social media sources, such as a social media website such as Facebook or LinkedIn. In other embodiments, non-blockchain transactions 608 may include information regarding a user dispute, where the user could have provided information disputing a blockchain transaction, such as a blockchain transaction that the user believes should not be associated with the user's blockchain account or blockchain ID.

The user trust profile 602, and its related information, including blockchain information 606, user information 604, and non-blockchain transactions may be stored or maintained in memory or within a database associated with any of the nodes of a blockchain-based network (e.g., Nodes 1-4 (102-132) of blockchain-based network 100) as described herein.

ADDITIONAL CONSIDERATIONS

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location, while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other embodiments, the one or more processors or processor-implemented modules may be distributed across a number of geographic locations.

This detailed description is to be construed as exemplary only and does not describe every possible embodiment, as describing every possible embodiment would be impractical, if not impossible. One may be implement numerous alternate embodiments, using either current technology or technology developed after the filing date of this application.

Those of ordinary skill in the art will recognize that a wide variety of modifications, alterations, and combinations can be made with respect to the above described embodiments without departing from the scope of the invention, and that such modifications, alterations, and combinations are to be viewed as being within the ambit of the inventive concept.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed is:

1. A blockchain-based system, comprising:
one or more processors; and
a memory storing computer-executable instructions that, when executed by the one or more processors, cause the blockchain-based system to:
receive one or more blockchain IDs associated with a first user;
identify one or more blockchain transactions associated with the one or more blockchain IDs;
identify one or more non-blockchain transactions associated with the first user;
generate a trust profile for the first user based on the one or more blockchain transactions and the one or more non-blockchain transactions, wherein the trust profile includes a trust factor indicating an authentication level of the first user with respect to at least one activity;
receive, from a computing device and via a network, a request to perform a first activity, the request including a session blockchain ID associated with the first user;
based on the trust file and the session blockchain ID, establish a communication session corresponding to the session blockchain ID, via the network, between the computing device and the blockchain-based system;
identify, based at least in part on the one or more blockchain transactions, a first validation event that provides a first indication of validity for the first user to perform the first activity and a second validation event that provides a second indication of validity for the first user to perform the first activity;
assign a first weight to the first validation event and a second weight to the second validation event;
determine a third indication of validity for the first user to perform the first activity based at least in part on the first validation event with the first weight and the second validation event with the second weight;
determine that the third indication of validity is equal to or greater than a validity threshold; and
authorize the first user to perform the first activity via the communication session.

2. The blockchain-based system of claim 1, further configured to:
determine that the session blockchain ID is one of the one or more blockchain IDs associated with the first user.

3. The blockchain-based system of claim 1, wherein the communication session between the computing device and the blockchain-based system includes a chat session that allows message communications between the computing device and the blockchain-based system.

4. The blockchain-based system of claim 1 further configured to:
receive an additional blockchain ID associated with the first user;
identify one or more additional blockchain transactions associated with the additional blockchain ID; and
update the trust profile for the first user based on the one or more additional blockchain transactions.

5. The blockchain-based system of claim 1, further configured to determine one or more loyalty benefits for the first user based on the trust profile.

6. The blockchain-based system of claim 1, wherein the trust profile includes first user information associated with at least one of user tax records, user bills, user social media information, or one or more photos of the first user.

7. The blockchain-based system of claim 1, the instructions further causing the blockchain-based system to:
   in response to determining that the third indication of validity is less than the validity threshold, determine whether the trustor factor indicates the first user is authorized to perform the first activity,
   in response to determining that the trustor factor indicates the first user is authorized to perform the first activity, authorize the first user to perform the first activity, and
   in response to determining that the trustor factor indicates the first user is not authorized to perform the first activity, instruct the first user not to perform the first activity.

8. The blockchain-based system of claim 1, the instructions further causing the blockchain-based system to:
   receive a security-based indicator for the first user; and
   update the third indication of validity for the first user to perform the first activity based on the security-based indicator and the first validation event, wherein the security-based indicator includes at least a biometrics indicator.

9. A blockchain-based method implemented on a computing device having one or more processors and a memory storing computer-executable instructions, the method comprising:
   receiving one or more blockchain IDs associated with a first user;
   identifying one or more blockchain transactions associated with the one or more blockchain IDs;
   identifying one or more non-blockchain transactions associated with the first user;
   generating a trust profile for the first user based on the one or more blockchain transactions and the one or more non-blockchain transactions, wherein the trust profile includes a trust factor indicating an authentication level of the first user with respect to at least one activity;
   receiving, from a remote device, a request to perform a first activity, the request including a session blockchain ID associated with the first user;
   based on the trust file and the session blockchain ID, establishing a chat session corresponding to the session blockchain ID between the remote device and the blockchain-based system that allows message communications between the remote device and the blockchain-based system;
   identifying, based at least in part on the one or more blockchain transactions, a first validation event that provides a first indication of validity for the first user to perform the first activity and a second validation event that provides a second indication of validity for the first user to perform the first activity;
   assigning a first weight to the first validation event and a second weight to the second validation event;
   determining a third indication of validity for the first user to perform the first activity based at least in part on the first validation event with the first weight and the second validation event with the second weight;
   determining that the third indication of validity is equal to or greater than a validity threshold; and
   authorizing the first user to perform the first activity via the chat session.

10. The blockchain-based method of claim 9, further comprising:
    determining that the session blockchain ID is one of the one or more blockchain IDs associated with the first user.

11. The blockchain-based method of claim 9, further comprising:
    receiving an additional blockchain ID associated with the first user;
    identifying one or more additional blockchain transactions associated with the additional blockchain ID; and
    updating the trust profile for the first user based on the one or more additional blockchain transactions.

12. The blockchain-based method of claim 9, further comprising:
    determining one or more loyalty benefits for the first user based on the trust profile.

13. The blockchain-based method of claim 9, wherein the trust profile includes first user information associated with at least one of user tax records, user bills, user social media information, or one or more photos of the first user.

14. A tangible, non-transitory computer-readable medium storing instructions, when executed by one or more processors of a first computing device communicatively coupled to a blockchain-based system, cause the first computing device to:
    receive one or more blockchain IDs associated with a first user;
    identify one or more blockchain transactions associated with the one or more blockchain IDs;
    identify one or more non-blockchain transactions associated with the first user;
    generate a trust profile for the first user based on the one or more blockchain transactions and the one or more non-blockchain transactions, wherein the trust profile includes a trust factor indicating an authentication level of the first user with respect to at least one activity;
    receive, from a second computing device, a request to perform a first activity, the request including a session blockchain ID associated with the first user;
    determine that the session blockchain ID is one of the one or more blockchain IDs associated with the first user;
    establish a chat session corresponding to the session blockchain ID between the second computing device and the blockchain-based system based on the trust file;
    identify, based at least in part on the one or more blockchain transactions, a first validation event that provides a first indication of validity for the first user to perform the first activity and a second validation event that provides a second indication of validity for the first user to perform the first activity;
    assign a first weight to the first validation event and a second weight to the second validation event;
    determine a third indication of validity for the first user to perform the first activity based at least in part on the first validation event with the first weight and the second validation event with the second weight;
    determine that the third indication of validity is equal to or greater than a validity threshold; and
    authorize the first user to perform the first activity via the chat session.

15. The tangible, non-transitory computer-readable medium of claim 14, wherein the non-transitory computer-readable medium further includes instructions that, when executed by the one or more processors, cause the first computing device to:
    generate a new blockchain transaction of the first user;
    update the trust profile for the first user with user information determined from the new blockchain transaction; and
    update at least one corresponding blockchain with the new blockchain transaction.

16. The tangible, non-transitory computer-readable medium of claim 14, wherein the trust profile is configured to update one or more accounts of the first user based on the trust profile.

* * * * *